US006967643B2

(12) United States Patent
Tichy et al.

(10) Patent No.: US 6,967,643 B2
(45) Date of Patent: Nov. 22, 2005

(54) TACTILE FEEDBACK FOR CURSOR CONTROL DEVICE

(75) Inventors: Thomas Henry Tichy, Albuquerque, NM (US); Steven L. Steinbrunner, Coldwater, OH (US)

(73) Assignee: CTS Corporation, Elkhart, IN (US)

( * ) Notice: Subject to any disclaimer, the term of this patent is extended or adjusted under 35 U.S.C. 154(b) by 661 days.

(21) Appl. No.: 09/773,243

(22) Filed: Jan. 31, 2001

(65) Prior Publication Data

US 2002/0101404 A1 Aug. 1, 2002

(51) Int. Cl.[7] .............................................. G09G 5/08
(52) U.S. Cl. ..................... 345/157; 345/156; 345/160; 345/161; 345/163; 345/167
(58) Field of Search ................................ 345/157, 156, 345/160–161, 163, 167–168; 341/20–22, 341/33; 340/325; 400/479–496; 178/18.01–18.07, 178/19.01–19.07, 20.01, 20.04

(56) References Cited

U.S. PATENT DOCUMENTS

| 3,928,741 | A | | 12/1975 | Comer |
| 4,124,787 | A | | 11/1978 | Aamoth |
| 5,146,566 | A | | 9/1992 | Hollis |
| 5,172,114 | A | | 12/1992 | Bedoya |
| 5,263,375 | A | | 11/1993 | Okada |
| 5,521,596 | A | | 5/1996 | Selker |
| 5,541,622 | A | | 7/1996 | Engle |
| 5,555,004 | A | | 9/1996 | Ono |
| 5,659,334 | A | | 8/1997 | Yaniger |
| 5,712,660 | A | | 1/1998 | Martin |
| 5,825,308 | A | | 10/1998 | Rosenberg |
| 5,912,661 | A | | 6/1999 | Siddiqui |
| 5,966,117 | A | * | 10/1999 | Seffernick et al. .......... 345/161 |
| 5,973,441 | A | * | 10/1999 | Lo et al. ..................... 310/330 |
| 5,973,670 | A | * | 10/1999 | Barber et al. ............... 345/157 |
| 6,241,684 | B1 | * | 6/2001 | Amano et al. .............. 600/531 |
| 6,259,188 | B1 | * | 7/2001 | Woodard et al. ........... 310/330 |
| 6,323,842 | B1 | * | 11/2001 | Krukovsky .................. 345/163 |
| 6,392,329 | B1 | * | 5/2002 | Bryant et al. ............... 310/328 |
| 6,545,666 | B1 | * | 4/2003 | Culler ......................... 345/168 |
| 2001/0005108 | A1 | * | 6/2001 | Saarmaa et al. ............ 310/345 |

* cited by examiner

*Primary Examiner*—Vijay Shankar
*Assistant Examiner*—Leonid Shapiro
(74) *Attorney, Agent, or Firm*—Mark P. Bourgeois

(57) ABSTRACT

An apparatus for providing a tactile feedback to a user of a computer cursor control device such as a pointing stick is provided. A pzt material is first mounted to a semi-rigid material such as by bonding the pzt material to a metal substrate. When an ac signal is applied to this assembly it vibrates. By coupling this mechanical vibration to the pointing stick, the user can sense the feedback. This can be used, for example, to provide a tactile feedback when the user depresses the pointing stick to cause a "mouse click."

2 Claims, 4 Drawing Sheets

TACTILE FEEDBACK FOR CURSOR CONTROL DEVICE

BACKGROUND OF THE INVENTION

Computers use various cursor control mechanisms to provide a physical control over cursor placement on the computer screen. The most common form of cursor control device is a mouse. The mouse includes a plurality of buttons to allow the user to select various items on the screen. When the user depresses the mouse button, the switch inside provides a tactile feedback to the user commonly referred to as a "mouse click."

Because a mouse is used in a position physically remote from the computer, it is not the preferred cursor control device for portable or laptop computers. In these computers, users want the freedom to operate the computer without any additional external devices. One frequently used cursor control mechanism incorporated into portable computers is that of a pointing stick. These devices have been described in many patents including U.S. Pat. No. 5,966,117 to Seffernick incorporated herein by reference. The Seffernick device provides a pointing stick mechanism including the ability for sensing a z-axis deflection. This z-axis deflection can be used to provide the mouse click function in place of providing separate buttons on the chassis of the computer. However, the pointing stick of Seffernick does not provide any tactile feedback to the user indicating that a click has occurred and is therefore not ideal.

The present invention overcomes this problem by providing a tactile feedback that can be easily provided with a pointing stick. The present invention also provides a mechanism for providing tactile feedback to the user for other conditions as desired by software within the computer.

DETAILED DESCRIPTION

Figure 1:
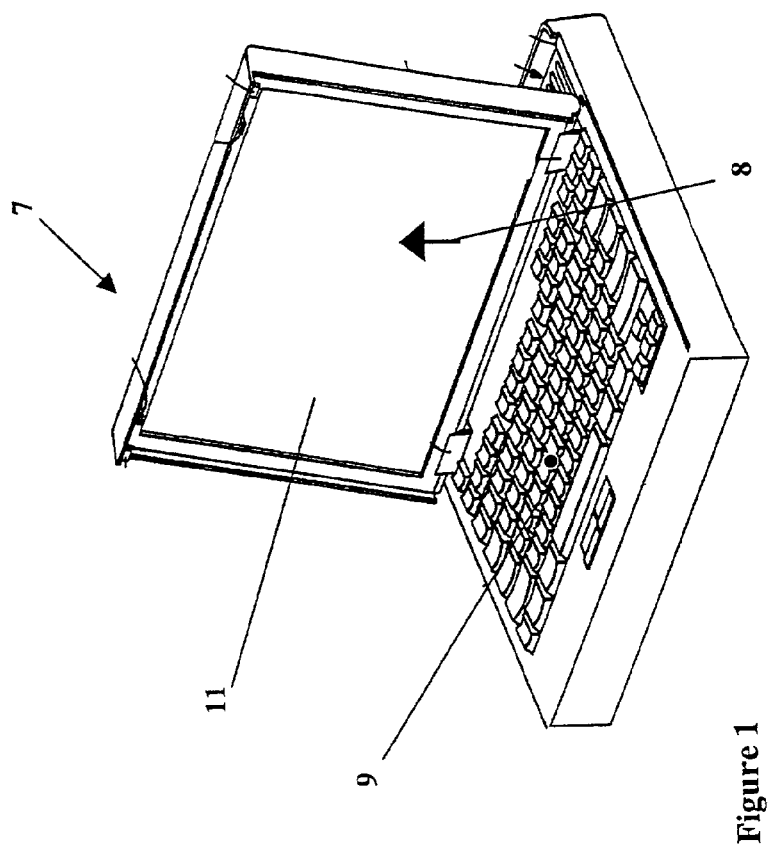
FIG. 1 shows a computer device incorporating the present invention

Computers typically are controlled by users through the use of various input control devices including a cursor control and keyboard. Computer 7 typically has a program running thereon that provides for movement of a cursor 8 on display device 11 in response to the user operating cursor control device 9. One such program is Microsoft Windows 98. Display device 11 can be any of a number of different devices, such as an LCD attached to a laptop computer; other similar devices such as a computer monitor employing a cathode ray tube (CRT) may also be used. Cursor control device 9 as shown in FIG. 1 is a pointing stick, although the invention is not limited to any particular pointing device. For example, cursor control device 9 may also be a mouse, joystick, wheel, trackball, or a touch pad. As shown in FIG. 1, cursor control device 9 is a pointing stick mounted between the "g" "h" and "b" keys on a standard "QWERTY" keyboard.

Cursor control device 9 allows a computer user to move the cursor 8 on display device 11. Cursor control device 9 therefore translates movement by the user into an electronic signal sent to the computer via a communications link which is internal to the computer 7 of FIG. 1.

Not shown is that computer 7 typically includes a central-processing unit (CPU), a random-access memory (RAM), and a read-only memory (ROM). The CPU, RAM, and ROM may be of any type; the invention is not particularly limited. In one embodiment, the CPU is an Intel Pentium processor, there are sixty-four megabytes of RAM, and the ROM contains such functionality as a basic input/output system (BIOS). Also not shown is that computer 7 also usually comprises a fixed storage device such as a hard disk drive with software resident thereon, and a removable storage device such as a floppy disk drive.

Figure 2:
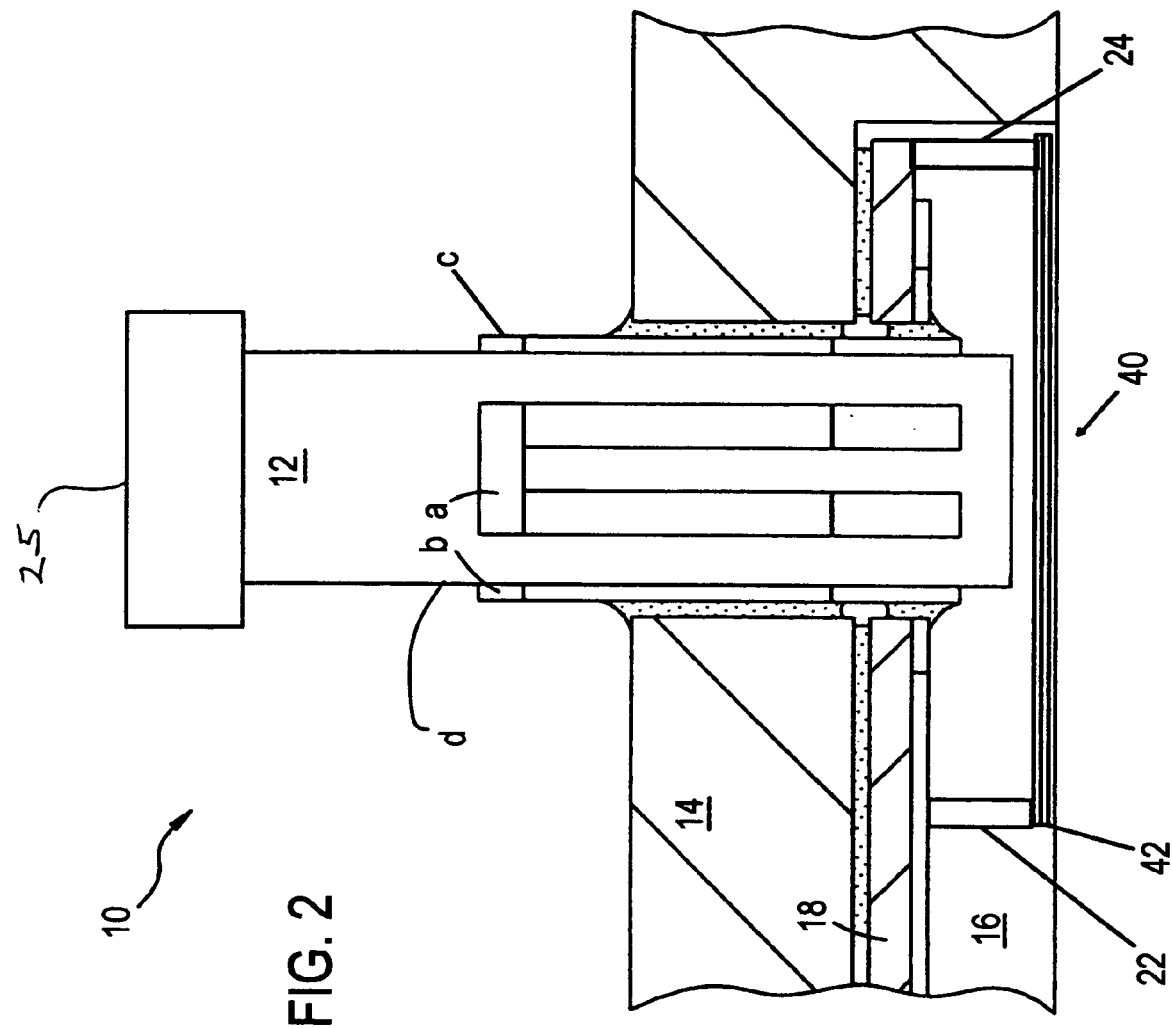
FIG. 2 shows a pointing stick according to the present invention.

Referring to FIG. 2, a pointing stick 10 according to the present invention is shown. In particular, the pointing stick 10 is made up of a shaft 12, a substrate 14 for supporting the shaft 12 and a cavity 16 formed in the substrate 14 for placement of a flexible cable 18 that is electrically connected to four strain gages a,b,c,d located on the sides of the shaft 12. The shaft 12 may be made of alumina ceramic material or the like. Typically, the cable 18 may be made of polyamide material containing electrical traces thereon. Typically, the pointing stick 10 has a rubber-like cap 25 positioned over the top of the shaft 12 to increase the ease of operation. The cap 25 is designed to enable the operator to control the cursor with a single finger positioned on top of it and pushing in a direction corresponding to the desired direction of the cursor. The finger pressure places strain on the shaft 12 that is sensed by the strain gages a,b,c,d. The output from the strain gages a,b,c,d can be used to sense a desired movement by the user in the x- or y-axis. Additionally, using the invention described in U.S. Pat. No. 5,966,117, movement in the z-axis can be sensed.

The tactile assembly 40 is attached to the bottom of the pointing stick 10. The tactile assembly comprises a piezo-electric (pzt) material 42. The pzt material is lead zironate and lead titanate in addition to other dopants as will be known by those skilled in the art. The material is pressed in powder form under extremely high pressure and then fired at 1250° C. A high voltage is then applied across the material. This aligns the molecular domains and is commonly referred to as poling. This creates a block of pzt ceramic material which is then machined into wafers. The wafer can then be bonded to a semi-rigid substrate such as metal, plastic or alumina using an adhesive such as epoxy.

Figure 3:
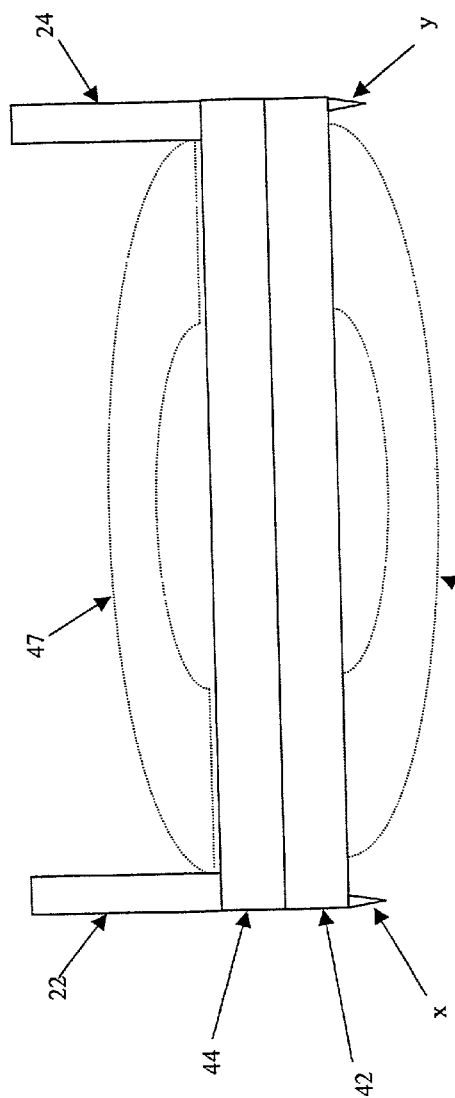
FIG. 3 shows a pzt assembly according to the present invention.

When an electrical power source (not shown) is connected to this material, it changes physical dimensions in that the wafer will either increase in size with a corresponding decrease in thickness or, with the opposite polarity electrical signal, it will decrease in size with a corresponding increase in thickness. If the piezo-electric material 42 is attached to a semi-rigid material 44 such as being bonded to a metal substrate, the entire surface bows or deforms. This is similar in action to the effect of two materials being bonded together with differing thermal coefficients; the difference causes the assembly to warp as temperature is varied. As shown in FIG. 3, as the electric power source is applied via terminals x,y, the entire piece of material flexes in an upward direction 47; when the reverse power is applied, the material deforms in the opposite or downward direction 49. If the flexing in opposite directions occurs rapidly, it produces a vibration.

By controlling the frequency of an ac power source connected via terminals x,y applied to the piezo-electric material 42, the frequency of the vibration can be controlled. Through experimentation, it has been found that a frequency of approximately 350 hz yields a vibration that can be easily felt by the user. While the invention is generally described using a circular pzt material, other forms could also be used including a square or rectangular structure.

The piezo-electric material 42 mounted to the semi-rigid material 44 is mechanically coupled to the pointing stick 10. As shown in FIG. 2, the material is mounted via stand-offs 22,24 which maintain a slight separation between the tactile assembly 40 and the substrate 14. This prevents the substrate from impeding the vibration of the tactile assembly 40. The stand-offs 22,24 also provide the mechanical coupling to deliver the vibration through the substrate 14 and along the shaft 12 to the user. The physical attachment mechanism may be accomplished through any common connection mechanism such as screws, bolts, rivets, etc. While some adhesives could be used, it is important to select one that will not dampen the vibrations to a point where the user will no longer feel them. The pzt material can also be mounted in other ways, provided the mechanical coupling of the vibration is accomplished. Thus, for example, the pzt material could be mounted to the substrate 14 further away from the shaft 12 of the pointing stick 10. The tactile assembly 40 could also be mounted directly to the shaft 12 of the pointing stick 10 without the use of stand-offs 22,24, provided the piezo-electric material 42 was cantilevered out beyond the edge of the shaft 12 to allow for the flexing to produce the required vibration. The pzt material could also be bonded to other layers of pzt material and this multi-layer package could be used as the substrate 14.

Figure 4:
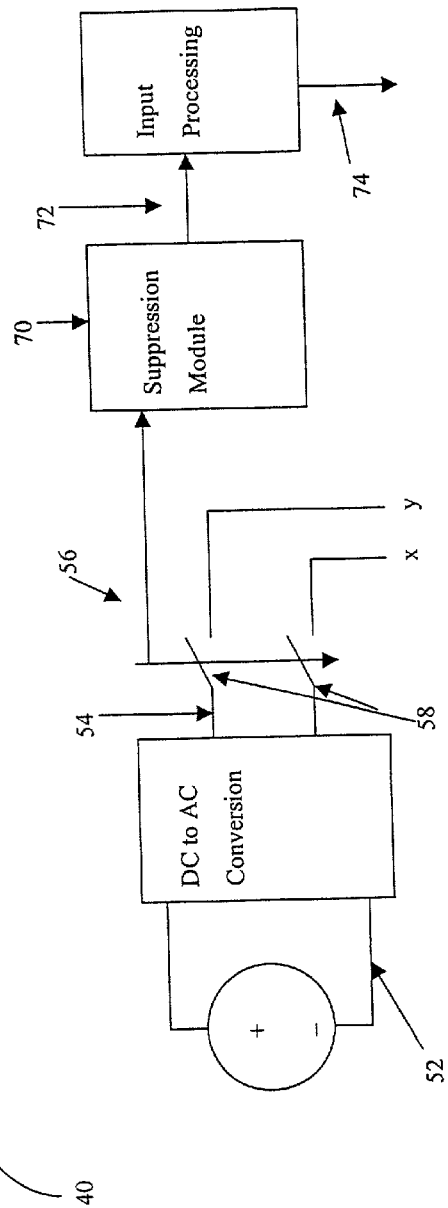
FIG. 4 shows a block diagram of an electrical circuit for activating the pzt assembly.

A driver circuit 50 for providing the ac signal to the tactile assembly 40 is shown in FIG. 4. The computer dc power source of 12 volts 52 is provided to the circuit 50. This input is then put through a conversion to provide an ac signal 54 of 24 volts peak to peak operating at approximately 350 Hz. This is the desired input range to the piezo-electric material 42. The ac signal 54 is then applied to the piezo-electric material 42 upon receiving an input signal 56 from another source. This input signal 56 may be provided either directly through sensing a z-axis deflection (which corresponds to a mouse-click) or through software resident in the computer 1. Once the input signal 56 is provided, it activates a switch circuit 58 which turns on the ac signal 54 for a limited, predetermined period of time. It has been found that approximately one second is a time sufficient to provide the desired feedback to the user without unduly interfering with the use of the computer.

Figure 5:
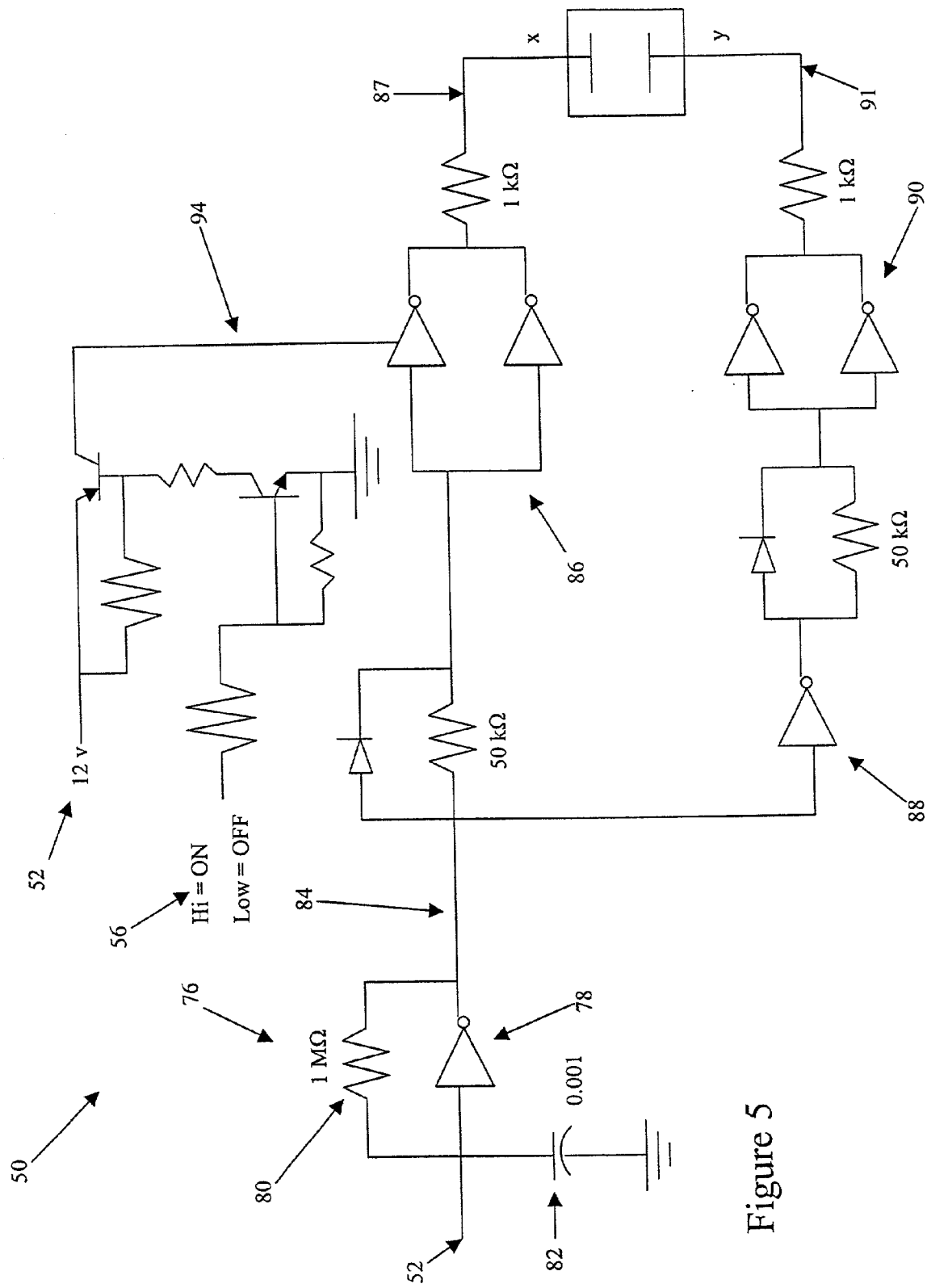
FIG. 5 shows a circuit diagram for driving the feedback device according to the present invention.

This driver circuit 50 is shown in more detail in FIG. 5. The 12 volt power supply 52 from the computer first goes into a square wave generator 76. The square wave generator 76 consists of an inverter 78 with a feedback resistor 80 and capacitor 82. By varying the values of feedback resistor 80 and capacitor 82, the frequency of the square wave 84 can be adjusted. To achieve a frequency of 350 Hz, the feedback resistor 80 has a value of 1 MΩ and the capacitor 82 has a value of 1 $\mu$F. The square wave 84 is then applied to a paralleled inverter set 86. The square wave 84 is also applied through an inverter 88 to a second paralleled inverter set 90 to produce a wave form shifted 180° from the original square wave 84. The first paralleled inverter set output 87 is applied to Terminal X on one side of the pzt material 42 and the second paralleled inverter set output 91 is applied to the Terminal Y on other side of the pzt material 42. Thus, by applying opposite wave forms across the pzt wafer, the voltage is effectively doubled. This circuit therefore takes the 12 volt dc power supply and converts it to a 24 volt ac peak to peak signal. This is then capable of driving the pzt material sufficiently to produce vibrations that can be felt by the user. The input signal 56 to activate the pzt material 42 is provided from the cpu or other analog circuitry (not shown). The signal provides a switching signal 94 to the inverters 86. This circuit uses easily available materials to provide a cost-effective electrical source for the pzt material; it is envisioned that this could be done in a number of equally useful manners. Similarly, while the preferred design uses a 24 peak to peak square wave to drive the pzt material, it would be recognized by one skilled in the art that a variety of other input signals could be used. It should also be recognized that the 24 volt signal was selected because of the relative cost-effectiveness of doubling the power supply voltage available in the computer; however, as the voltage increases the amplitude of the vibration would increase as well. Thus, the amount of tactile feedback could be increased by increasing the drive voltage if that was found to be desirable.

Another approach to enhance the vibration provided to the user is to mount multiple layers of pzt material on top of each other. When properly poled layers of pzt material are placed on top of each other, activating them in concert naturally increases the overall effect. This can be used to provide a greater amount of vibration. This approach can also be used to reduce the footprint of the pzt material required; by increasing the vibration output through the use of multiple layers, the footprint can be reduced. This can be useful where space limitations are critical.

The driver circuit 50 was designed to be cost-effective and to occupy minimal space on a circuit board. A single package is readily available that includes the six inverters required. Similarly, the circuit that generates the switching signal 94 is available in a single integrated circuit. The remaining resistors, capacitor and diode are readily available and can be mounted to occupy minimal space. Thus, this circuit was selected to provide a simple, cost-effective driver for the pzt material.

The driver circuit also includes input suppression module 70. When the pzt material is activated, the cursor control device will be subject to the resulting vibrations. These vibrations will be sensed by the strain gages a,b,c,d as cursor control inputs. The vibrations will therefore cause the cursor to move or jump on the display device. Suppression module 70 senses the input signal 56 and deactivates the cursor control signal 74 for the duration of the vibrations via suppression signal 72. After the pzt material is stable again, the suppression signal 72 is released and the user input to the cursor control device will again be sensed.

A slight modification to this system would incorporate a suppression filter. In this approach, during tactile feedback operation, the cursor control signal is filter for the spurious signals resulting from the tactile feedback, but the larger scale cursor control movements are still sensed. This would simply eliminate the results of the tactile feedback operation without interfering with the overall operation of the device.

It should be obvious to one of ordinary skill in the art that the suppression function could also be performed in software. Following a mouse click input, the software could simply ignore cursor control inputs from the cursor control device until a preset period of time had passed. In this way, the same function could be accomplished without the need for any additional electronics or hardware.

Figure 6:
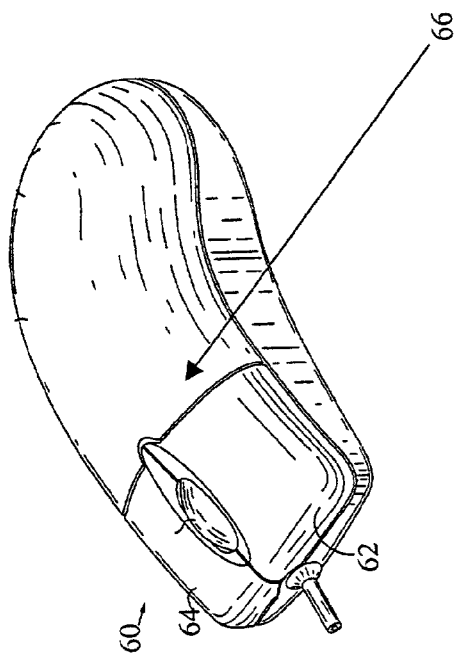
FIG. 6 shows a standard computer mouse incorporating the present invention.

An alternative arrangement is shown in FIG. 6 using a standard computer mouse 60. The mouse 60 includes two buttons 62,64. One button is configured in the computer to provide a left click signal 62 and the other to provide a right click signal 64. A tactile assembly 66 is provided internally to the mouse similar in all respects to those described above in conjunction with the pointing stick. The precise mounting of the tactile feedback assembly 66 including a piezo-electric material is not shown but could be accomplished similar to the mounting described above or through any other mounting mechanism that allows sufficient mechanical coupling to deliver the vibrations to the mouse 60. Upon receiving a button click 62 or 64 signal, the piezo-electric material 68 is activated via an ac power source. Similar to the pointing stick implementation described previously, the power source is activated for approximately one second to provide the tactile feedback to the user.

Additionally, software commonly used in computers provides "active areas." These are various points on the screen that allow a direct link to other information or data via user selection. For example, in Windows 98, the "desktop" screen includes icons corresponding to a number of software applications resident on the harddrive of the computer. The user can launch an application by placing the cursor over an icon and "double-clicking" by depressing the left mouse button twice in rapid succession. The present invention can be used to provide feedback to the user when the cursor is positioned over an active area on the screen. So, for example, as the user moved the cursor control device and the cursor encountered an icon on the desktop, the tactile feedback would be engaged to provide the user an indication of the cursor's position. This could be done, for example, to help people with coordination or sight problems locate the active areas on the screen.

It should be apparent that the detailed description above is illustrative only and should not be taken as limiting the scope of the invention. Similarly, not all of the functions performed by the embodiment disclosed need be performed in any one mechanism or circuit. Accordingly, the invention should be understood to include all such modifications as come within the scope and spirit of the following claims and equivalents thereto.

We claim:

1. A tactile feedback for a cursor control device comprising:
    a cursor control device for providing a desired cursor movement, the cursor control device having a top and bottom, the top of the cursor control device adapted to be touched by a user;
    a piezo-electric assembly operable as a source of vibrations;
    a control device for sensing a predefined condition and providing an electrical signal to activate the piezo-electric assembly; and wherein the piezo-electric assembly is mechanically coupled to the bottom of the cursor control device to deliver the vibrations to the user; and
    an input suppression module coupled to the cursor control device, the input suppression module adapted to deactivate the cursor control device for a pre-determined period of time in response to detecting the electrical signal generated by the control device.

2. A method for providing a tactile feedback comprising the following steps:
    providing a cursor control device having a top and a bottom;
    providing a piezo-electric assembly that vibrates upon electrical activation;
    mounting the piezo-electric assembly to the bottom of the cursor control device to provide a mechanical transfer of vibrations from the piezo-electric assembly to the cursor control device; sensing a predefined condition for which tactile feedback is desired;
    disabling the cursor control device when the predefined condition is sensed;
    activating the piezo-electric assembly to provide mechanical vibrations to the cursor control device for a predetermined period of time; and
    enabling the cursor control device after the predetermined period of time.

* * * * *